US007936282B2

(12) United States Patent
Matalon

(10) Patent No.: US 7,936,282 B2
(45) Date of Patent: May 3, 2011

(54) APPARATUS AND METHOD FOR CONTROLLING MOVING VEHICLES

(75) Inventor: Aron Matalon, Tel Aviv (IL)

(73) Assignee: Aron Matalon, Tel Aviv (IL)

( * ) Notice: Subject to any disclaimer, the term of this patent is extended or adjusted under 35 U.S.C. 154(b) by 1379 days.

(21) Appl. No.: 11/362,363

(22) Filed: Feb. 23, 2006

(65) Prior Publication Data

US 2006/0208924 A1 Sep. 21, 2006

Related U.S. Application Data

(63) Continuation of application No. PCT/IL2004/000767, filed on Aug. 23, 2004.

(30) Foreign Application Priority Data

Aug. 24, 2003 (IL) .......................................... 157557

(51) Int. Cl.
*G08G 1/00* (2006.01)
*G06K 5/00* (2006.01)

(52) U.S. Cl. ........................................ 340/901; 235/382

(58) Field of Classification Search .................. 340/933, 340/573.4, 572.1, 539.11, 5.8, 901; 235/382
See application file for complete search history.

(56) References Cited

U.S. PATENT DOCUMENTS 3,720,911 A 3/1973 Bomar
4,121,102 A * 10/1978 Wilson ...................... 250/341.1
4,159,467 A * 6/1979 Ballin .......................... 307/10.5
4,207,468 A * 6/1980 Wilson ....................... 250/341.1
5,420,794 A 5/1995 James
5,508,705 A * 4/1996 Spiess ............................. 342/44
5,581,249 A * 12/1996 Yoshida ........................ 340/928
5,745,026 A * 4/1998 Kokubu et al. ........... 340/286.01
5,751,973 A 5/1998 Hassett
6,339,384 B1 * 1/2002 Valdes-Rodriguez ........ 340/928
6,388,579 B1 * 5/2002 Adcox et al. .................. 340/902
7,248,719 B2 * 7/2007 Hoffman et al. .............. 382/115
2003/0080878 A1 * 5/2003 Kirmuss ....................... 340/936
2004/0232228 A1 * 11/2004 Gotfried et al. ............... 235/382
2006/0208924 A1 * 9/2006 Matalon ........................ 340/933

FOREIGN PATENT DOCUMENTS

DE 44 46 674 6/1996
GB 2 182 183 5/1987
GB 2 227 866 8/1990
GB 2 344 914 6/2000
JP 2001 126091 5/2001

OTHER PUBLICATIONS

International Preliminary Report on Patentability for International Application No. PCT/IL2004/000767 filed on Aug. 23, 2004.

* cited by examiner

*Primary Examiner* — Benjamin C Lee
*Assistant Examiner* — Sigmund Tang
(74) *Attorney, Agent, or Firm* — Knobbe, Martens, Olson & Bear LLP

(57) ABSTRACT

Apparatus for controlling vehicles, particularly for security purposes, law enforcement and fleet management, is disclosed. In one embodiment, the apparatus comprises a car unit (CU) permanently mounted in the vehicles, which transmits vehicle identification (ID) and a road unit (RU), which receives the identification and singles out suspect vehicles. The apparatus may include a portable personal unit (PU), which identifies the driver.

32 Claims, 4 Drawing Sheets

*Fig. 4B*
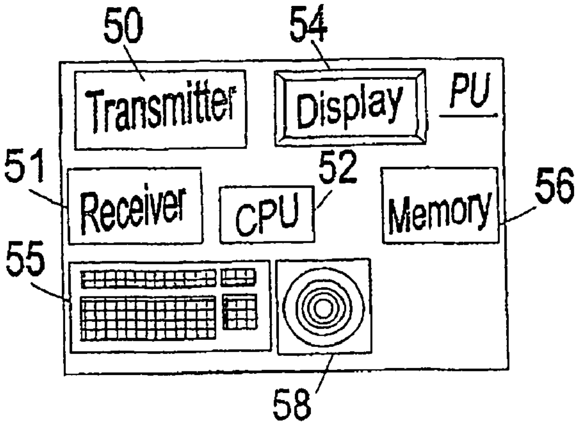
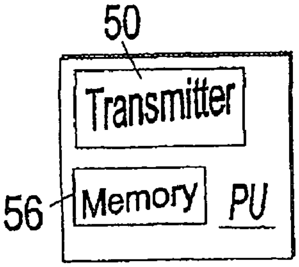
*Fig. 4A*
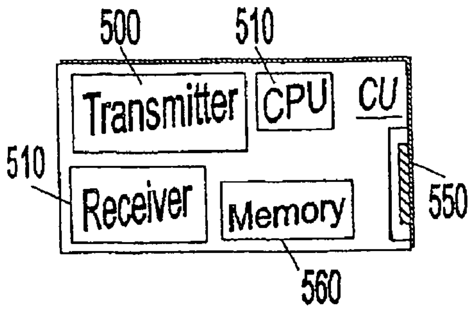
*Fig. 5*
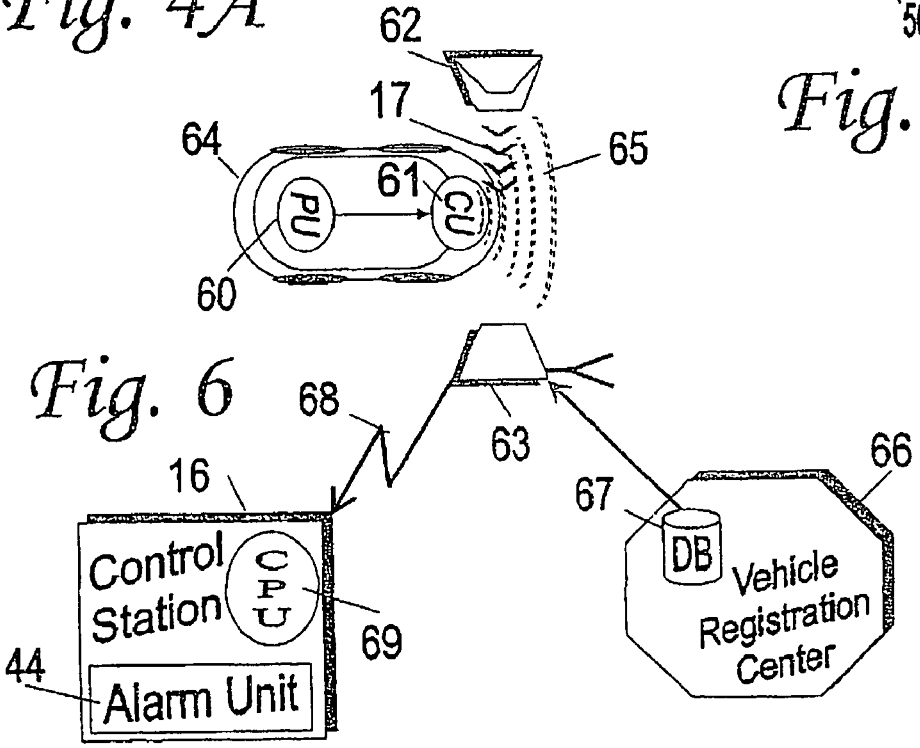
*Fig. 6*

APPARATUS AND METHOD FOR CONTROLLING MOVING VEHICLES

RELATED APPLICATIONS

This application is a continuation application, and claims the benefit under 35 U.S.C. §§120 and 365 of PCT Application No. PCT/IL2004/000767, filed on Aug. 23, 2004 and published on Mar. 3, 2005, in English, which is hereby incorporated by reference.

BACKGROUND OF THE INVENTION

1. Field of the Invention

This invention relates to an apparatus and a method for controlling vehicles transiting on a road and signaling vehicles which, in themselves or because of their drivers, are suspected to be irregular, unlawful or even dangerous, and, if desired, raising an alarm and/or permitting security personnel to stop the suspected vehicles and perform a thorough security check on the spot. Suspected vehicles may include those driven by possible lawbreakers or by unauthorized persons, those the appearance of which does not match their identifying numbers, those the plates of which appear not to be the correct ones or to be counterfeited, and so forth.

2. Description of the Related Technology

The control of vehicles, particularly motor cars and trucks or mini-buses or the like, for various purposes, is a presently daily occurrence. There may be different reasons for carrying out such a control. For instance, it may be feared or indicated by confidential information received, that the occupants of the vehicle transiting a given road may be involved or plan to carry out a terrorist activity and therefore all vehicles transiting on said road must be carefully scrutinized to identify any suspect vehicle and take the necessary action. Vehicles may be controlled also for the purpose of discovering stolen vehicles, or vehicles that violate the law in any way, such as by not having appropriate license or not having paid the required taxes and so forth. Be as it may, such controls usually involve stopping each vehicle at a given control station and obliging the following vehicles to stand in long queues, thereby disrupting traffic, causing inconvenience and sometimes serious damage by the resulting delays, and keeping a number of members of the armed forces or the police occupied in the lengthy and tiresome task of controlling each vehicle in detail.

SUMMARY OF CERTAIN INVENTIVE ASPECTS

One aspect of the invention provides means for singling out suspect vehicles while allowing all the vehicles to continue moving, though perhaps at a limited speed for a given stretch of the road. The vehicles that would be so singled out as suspect, can then be caused to stop at a later station and there undergo the most complete control. It will be apparent that if this can be done successfully, the controls will be much more thorough, because more time and personnel will be available to carry them out. Additionally, in this way all the vehicles transiting the road can be checked utilizing a small number of trained personnel without stopping the flow of traffic. Present-day controls, on the contrary, are not fully reliable because they must be carried out in a relatively short time and by overworked personnel, if the disturbance of the traffic should not become unbearable.

Another aspect of the invention permits to single out suspect vehicles from a row of transiting vehicles, without stopping them, whereby to separate and thoroughly check the vehicles that have been found to be suspect.

Another aspect of this invention provides electronic devices that emit signals which permit to separate vehicles that are fully correct, as to their identity and to the identity of the driver, from vehicles that are not so correct.

Another aspect of this invention provides such devices which can perform useful functions in preventing or recognizing the theft of vehicles.

Another aspect of this invention provides devices, hereinafter "processing devices" which can receive and process signals received from devices mounted on the vehicles or contained therein, and indicate such vehicles as appear suspect from the aforesaid signals.

Another aspect of this invention provides such processing devices which can be set up at any given location and transported, when required, to a different location.

Another aspect of the invention provides such processing devices that can be set up permanently at a given location.

Another aspect of the invention provides a process whereby control personnel, typically belonging to the armed forces or to the police, may recognize suspect vehicles in transit along a given road, without stopping traffic, and stop them, and them only, for an exhaustive control.

Another aspect of the invention provides an apparatus of the invention which comprises:

a portable personal unit (hereinafter PU), which identifies the driver, a car unit (hereinafter CU) permanently mounted in the vehicle, which identifies the vehicle car and the driver and a road unit (hereinafter RU), which comprises two parts, a transmitting beacon and a transceiver-processing unit.

One embodiment of the invention can be applied to automobiles and any vehicle including naval, airborne or ground, and therefore any reference made to "cars" includes all vehicles and is not to be understood as a limitation.

In one embodiment, the PU is a small, periodically (e.g., transmitting once within 10-20 second intervals) transmitting transceiver, the transmissions of which have a very short range, e.g., 1-4 meters, sufficient for being received by the CU as long as the driver is in the car, but too short to be received by the CU if the driver leaves the car. In one embodiment, the PU stores a number of data identifying the driver (briefly, the driver's ID) and transmits them, periodically, when activated, so that they be received by the CU. The PU can be small enough to be conveniently carried by the drivers, e.g., coin-sized.

In one embodiment, the PU can also receive and store a code to be used to activate the PU, so that when the driver wishes to drive the vehicle, the activating code will be entered to activate the PU. If the driver leaves the car, the PU can be considered as inactivated, because its transmissions will no longer reach the CU. To avoid the need for a plurality of PUs when the same driver may drive different cars, a plurality of codes may be provided to said driver who will enter the code that is appropriate to the car he wishes to drive at the moment, but the driver's ID are unique for each driver.

In one embodiment, the CU is mounted in the car in such a way that it will be extremely difficult to remove it or change it, or such that it would be irrevocably damaged or destroyed due to any such attempts. It may be impossible to prevent its removal altogether, but it is possible to cause said removal to affect other devices and/or cause such damages that it will leave a trail recognizable in the security check according to one embodiment of the invention or will even render the vehicle impossible to drive, or emit a signal identifying the tamper attempt.

In one embodiment, the RU comprises a component, hereinafter a "transmitting beacon", which will identify the passing of a vehicle, typically by continually transmitting a signal, and a RU processor which receives beacon signals, and when the signals are blocked by a passing vehicle, activates the RU to receives the signal emitted by the CU of the said vehicle, hereinafter "the identifying signal". The signal transmitted by the transmitting beacon may be a light signal (e.g., infrared) and the transmitting beacon may be embedded into the RU processor such that it receives a mirrored reflection of the transmitted beacon.

In one embodiment, the RU processor has a narrow angle antenna better to discriminate between signals. The RU processor singles out the suspect vehicles by checking the validity of the Driver ID and the Car ID or by comparing the CU signal to a database, which comprises all the legitimate combinations of vehicle identifications and driver identifications. For this purpose, the RU processor can have a memory, which contains a database received from the competent vehicle registration authority and continuously updated by it. Such a memory can be contained in a chip of very limited size and easily changed.

In one embodiment, the RU processor issues an alarm indication whenever: i) no CU transmission is received from a passing vehicle, namely, the vehicle is not equipped with a CU or the CU is damaged or was removed, ii) CU transmission is received from the passing vehicle but it includes only the vehicle ID (does not include Driver ID), iii) if the RU processor does not find in said database the transmitted CU signal, which comprises combined identification of the vehicle and of the person who is driving it at the moment contained in the CU signal it has received, or if the DB indicates that the driver and/or the vehicle are suspicious (e.g., reported as stolen). In such cases the RU processor will consider the said vehicle as suspect and send an alarm to the control personnel.

In one embodiment, the control personnel occupying the control station that occupy RU will be called hereinafter "the checking station", and the activities performed at the control station will be called collectively "the control". The checking station may be alerted in various ways, easily understood by skilled persons. The RU processor may transmit the plate number and other characteristics that permit easily to identify the suspect vehicle as it transits, to the checking station that is located in the vicinity or opposite to said processor. Then the said checking station will communicate to a second station located down the road, in front of which the suspected car will have to pass after passing in front of the checking station, and control personnel, located at said second station, will stop the suspect vehicle and thoroughly control it.

In one embodiment, the second station will be called hereinafter "the control station". Correspondingly, the activities performed at the control station will be called collectively "the control". The second station will be provided with a processor adapted to receive the messages from the checking station, hereinafter called "the control processor". The semantic difference between "checking station" and "control station" has the only purpose of clarifying the description.

In another embodiment, the RU processor may communicate directly with said control station the passage of a suspect vehicle and the ways for visually identifying it. The communication between the checking station and the control station, and the relative processors, will be carried out in any convenient way, e.g., by transceivers so oriented as not to interfere with the operation of the other components of the apparatus according to one embodiment of the invention, or by utilizing other communication links such as communication wires or wireless communication such as cellular telephony. Additionally, the RU processor may issue an alarm of any convenient kind, for instance an acoustic or optical alarm. It should be understood that the activities attributed herein to a given component, may be divided among different, cooperating sub-components, without in any way departing from the invention.

In one embodiment, the check is carried out while the vehicles travel, generally at somewhat reduced speed, in a single line. This means that, if the road has two or more lanes, signs will be placed obliging the vehicles to form a single lane, which inevitably will travel at a somewhat reduced speed until the check station, and desirably also the control station, have been passed. A beacon, which continuously transmits a uniform signal, will be stationed at one side of the road and the RU processor will be stationed at the opposite side, so that the passage of each vehicle will block for a brief time the said uniform signal. During the time intervals in which said uniform signal no longer reaches the RU processor, the signal that this latter collects is the signal emitted by the CU of the car that is passing at that particular moment.

In one embodiment, photographic means, easily devised by skilled persons, can be associated to the apparatus. The photographic means may be adapted to acquiring a picture of the passing vehicles, and/or their license plates, for which CU signals were not received, or alternatively, for acquiring pictures of each and every passing vehicle. In this embodiment both the transmitting beacon and the RU processor will be temporarily placed at the checking station, on the ground or on suitable supports, and can be transported to another station, whenever desired.

In another embodiment, it is wished to avoid placing all the vehicles in a queue in a single lane, when the road has two or more lanes. For this purpose a transmitting beacon and a RU processor will be provided for each lane. They may be placed on the ground, if there is enough space between the different lanes, or they may be placed below the ground, in which case they cannot be moved so that such solution should be adopted only for checking stations of such importance that they are likely to be active continuously or at short intervals. Finally, if enough space is available, movable supports may be placed between the lanes and at the sides of the extreme lanes, to support the beacons and/or the processors and permit to transport them to another checking station, when desired.

In one embodiment, the control station does not need to be different from conventional control stations, except for the presence of a control processor and, optionally, other related alarm devices that will signal the approach of the suspect vehicles and indicate how to identify them. The suspect vehicles will be stopped by control personnel and submitted to the most thorough control.

The apparatus may also prevent or signal the theft of vehicles. The thief will not have one of the PUs authorized for that particular vehicle and therefore if the car was equipped with an immobilizer controlled by the CU, he cannot start the vehicle. If somehow he does start the vehicle, he will be identified at any check-control station. If somehow he succeeds in removing the CU and substituting it with another CU, counterfeit or obtained from another vehicle, it is still likely that the vehicle will still be recognized as suspect, because damage caused by such operations will be noticed, or if not, contradictions will be noticed between the CU signal and the plates or the type or color or other visible features of the vehicle.

In addition the system can be used to monitor cars and drivers for fleet management purposes.

One embodiment of the invention may be used for logging the vehicles ID and/or driver ID in certain locations, for instance, for statistical survey. The vehicles ID and/or driver ID may be optionally transmitted and stored in a remote location for logging.

The RU may be mounted on a vehicle for controlling moving and/or parking vehicles, and the transmissions of the CU are optionally performed periodically for a short instance of time.

The transmissions of the CU may be optionally used for the charging of parking vehicles and/or for the ticketing of unlawful parking.

In another embodiment, one or more additional RUs are used for determining the speed of passing vehicles. The RUs, which are located in predetermined distances, transmits the ID information of each passing vehicle to the control station which computes the vehicles speed according to the time differences between the transmissions.

One embodiment of the invention may be used for identifying members of a team, by providing one or more of the members a RU, and providing CUs to at least all other members, where the RU is capable of receiving CU signals transmitted from the CUs of the team members, and identify each team member according to the CU signal transmitted by its CU. In one embodiment, the RU is adapted to produce an alarm whenever a CU signal is absent for a predetermined period of time, and the CU signals are transmitted periodically by each CU. Optionally, the CU signals are transmitted only when a demand signal is received by the CU, where the demand signal is transmitted by a RU. Such demand signal may be transmitted periodically, or alternatively, the demand signal may be transmitted whenever the team member carrying the RU activates transmission of such signals.

The photographic means may further comprise:

a) an electro-mechanical car sensor for indicating that a transiting vehicle entered the photography zone of the photographic means, b) a memory for storing acquired photographs of said transiting vehicle, c) data communication means for forwarding the photograph of any suspected transiting vehicle for further processing and d) a controller for detecting suspected vehicles and for issuing a command to said photographic means which photographs to forward for further processing.

Alternatively, the apparatus may further comprise:

a) data communication means for forwarding images of any transiting vehicle for further processing and b) image processing means for processing the acquired images, using, for example, video motion detection (VMD) techniques, and for indicating that a transiting vehicle entered the photography zone of the photographic means.

BRIEF DESCRIPTION OF THE DRAWINGS

FIG. 4A-B are a schematic illustration of embodiments of a personal unit (PU).

FIG. 5 is a schematic illustration of an embodiment of a car unit (CU).

FIG. 6 is a diagrammatic schematic illustration of the method according to one embodiment of the invention.

DETAILED DESCRIPTION OF CERTAIN INVENTIVE EMBODIMENTS

Figure 1:
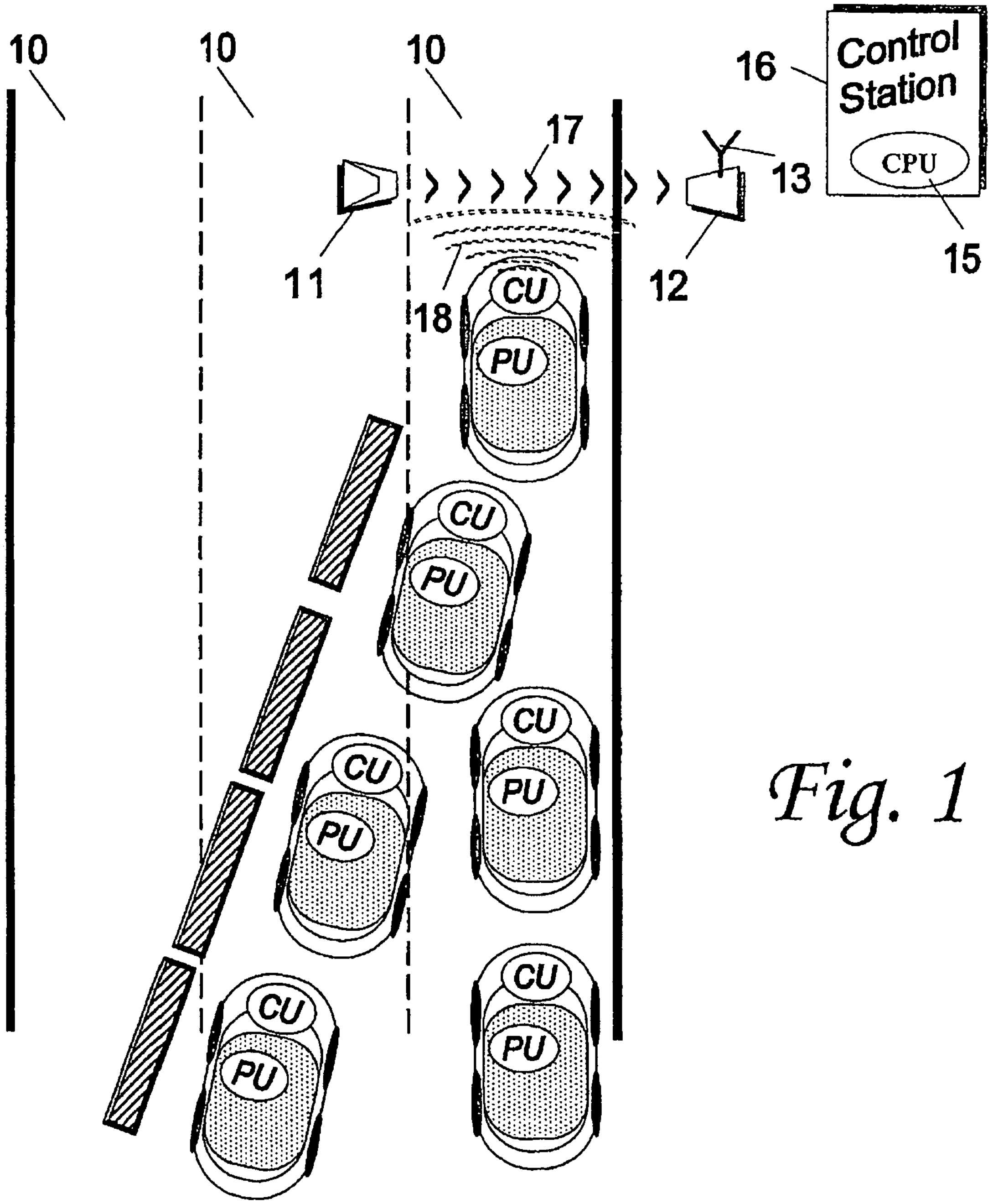
FIG. 1 is a schematic illustration of a first embodiment of the apparatus of the invention.

FIG. 1 schematically indicates one embodiment of the invention in which cars transiting on a multi-lane highway, in this case a three-lane highway, are forced to form a single line at a check station. Numeral 10 indicates the various lanes. A beacon 11 is placed at one side of the road. For example, the beacon 11 may be implemented utilizing an infra-red transmitter, for continuously transmitting a signal 17. At the other side of the road the RU processor 12, provided with antenna 13, is positioned. Said processor 12 includes an infrared receiver which receives the signals 17 transmitted from the beacon 11.

According to one embodiment of the invention the RU processor 12 contains the database of all the vehicle and driver identifications that are registered in the official records of the vehicle registration authority. When it receives a signal 18 from the CU, it compares it with the content of the database and if it does not find it, or if according to the database the registration authority requires that the vehicle and/or driver be checked (e.g., stolen vehicle), it identifies the vehicle as suspect and may give an acoustic or optical alarm.

The content of the suspect CU signal is transmitted directly, in this embodiment, to the control station 16. The Control Station 16 has a control processor 15, similar to processor of the RU processor 12. Conveniently, it also has means, possibly comprised in the control processor and not shown in the drawing, for sounding an acoustic alarm signal when the approach of a suspect vehicle is signaled by the RU processor.

The driver should possess a portable Personal Unit (PU), which includes driver's identification details (herein after ID, e.g., driving license). The PU periodically transmits the driver's ID to the CU. In one embodiment, the transmission of the PU is received by the CU when the driver is in the vehicle, and thus transmission for short distances is used. The CU receives the PU transmission and extract the driver ID included therein, and transmits a CU signal including the vehicle and the driver IDs. Otherwise, if the driver does not possess a PU, or if it is damaged or for any reason it is not received by the CU, the CU signal will include only the vehicle ID.

According to another embodiment of the invention the database of all the vehicle and driver identifications is maintained at the control station 16. In such embodiment the RU 12 is equipped with means for receiving the beacon signal and the CU signal, and means for transmitting and indication to the Control Station 16. The indication from the RU 12 should indicate the passing of a vehicle and the CU signal received. The control station 16 can be linked to the RU 12 via communication wires, or wirelessly utilizing radio transmission, for example. The RU indication is received at the control station 16, examined by the processor 15, which produce an alarm whenever the passing car and/or driver are required for a check.

The CU signal may be received by the control station 16. In this way the RU 12 can be simplified to include a beacon signals receiver and means for transmitting indications of a passing vehicle. Accordingly, the control station will receive the indication from the RU 12 and will activate a receiver to acquire the CU signal. In one embodiment, the CU signal is received at its maximal magnitude. In one embodiment, the receiver acquiring the CU signal measures the magnitude of the received CU signal and enable further processing of said signal only when the CU signal transmission reaches maximal magnitude (i.e., the distance between the passing vehicle and receiver is the minimal). For example, the receiver may determine the maximal magnitude whenever the magnitude of the CU signal starts to decrease.

Figure 7:
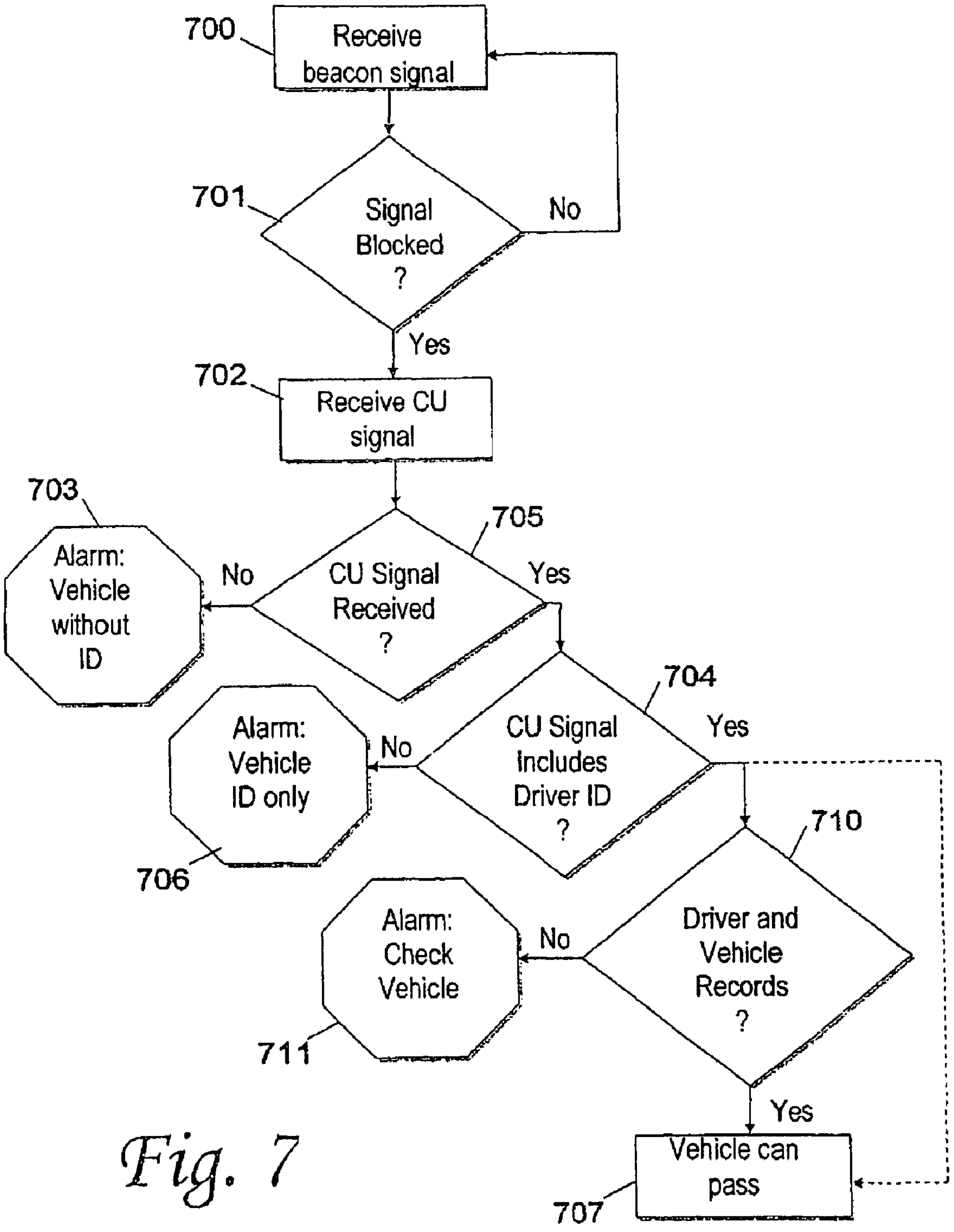
FIG. 7 is a flow chart illustrating the examination of the CU signal.

The examination performed by the processor 15 is illustrated in FIG. 7 in a form of a flowchart. This examination can be performed at the RU 12 if it includes the database of all the vehicle and driver identifications, and of course in such cases the RU 12 may produce an alarm whenever required. In steps 700 and 701 the RU 12 continuously receives beacon signals if the beacon signals are not blocked. If the beacon signals were blocked, in step 702 the RU 12 receives the CU signal form the passing vehicle.

In step 705 it is checked if CU was received. If CU signal was not received it means that the passing vehicle does not contain a CU, or that the CU is damaged. In such case alarm indication is produced in step 703, indicating that the passing vehicle is under suspicion and should be stopped for a check. If the CU signal was received, in step 704 it is checked if the CU signal includes the driver ID of the PU. If the CU signal does include driver ID it means that the driver probably does not have a driving license, or that the driver's PU is invalid. In any case in such situations an alarm is produced in step 706 indicating that the vehicle should be stopped for a check.

In step 710 the vehicle and the driver records in the database are examined. If according to the database records the driver and/or the vehicle are identified suspicious (should be stopped for a check, e.g., stolen vehicle) for any reason, an alarm is produced accordingly and the vehicle and/or driver is stopped for a check in step 711. The database maintained at the control station (or at the RU) may be a limited database including only the records of suspicious drivers and/or vehicles. If the driver and the vehicle are not suspicious the vehicle can pass the Control Station, as indicated in step 707, without stopping for a check.

Steps 700-702 may be performed by the RU 12 and steps 703-711 may be performed by the RU 12 or by the processor 15 at the control station 16, depending on the implementation. In one embodiment, steps 710-711 are performed only in cases wherein database records are maintained by the RU 12 and/or the control station 16 and only if such examination is indeed required. Otherwise the examination can be simplified to include steps 703-707, and of course in such situation vehicle/driver database records are not required. Accordingly, if database records are not maintained by the RU 12 or the control station 16, or if the CU signal examination is simplified and includes only steps 703-707, then the step 707 is performed if the examination performed in step 704 indicates that the CU signal includes driver ID (shown by a dashed line).

The RU in its fundamental form may include a receiver for receiving the beacon signals, and a receiver for receiving the CU signals. It may further include means for transmitting to the control station 16 indications of passing vehicles, said means may be an adapter for forwarding said indication via communication wires, or a wireless communication interface such as radio transmitter for instance. The indications transmitted from the RU indicate the control station that a vehicle has passed, and it includes the CU signal, if it was received. The RU may further include a memory for storing driver and/or vehicle records and processing means for examining the received CU signals and the corresponding records in said memory. In such case the RU should issue an alarm indication to the control station or center 16 whenever a suspicious vehicle is identified.

Figure 2:
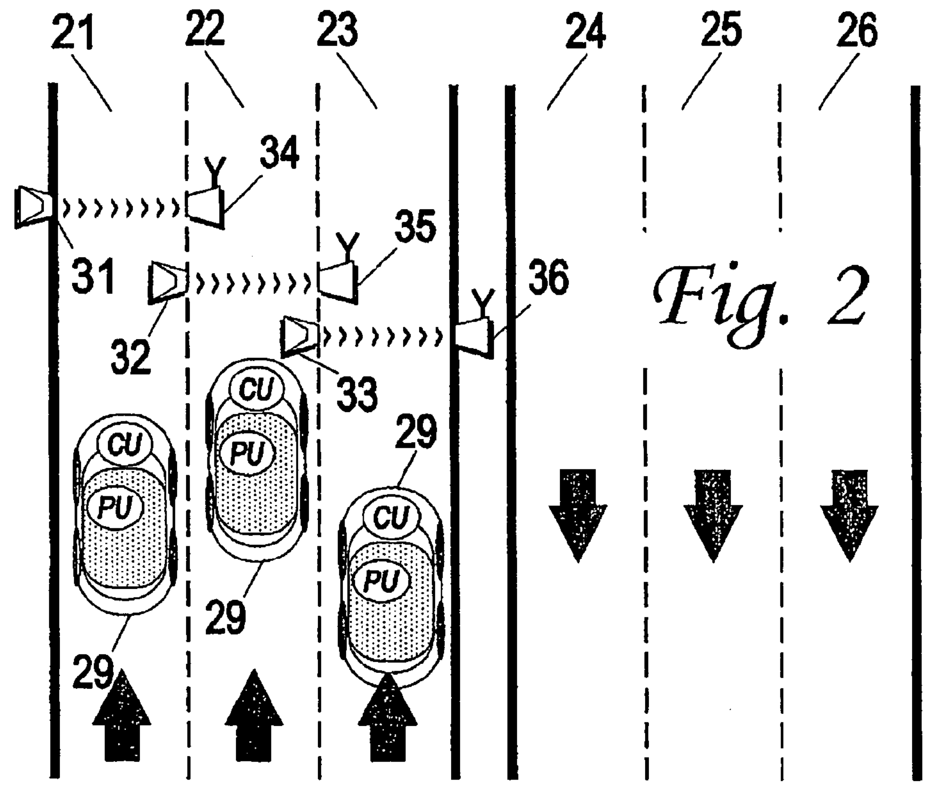
FIG. 2 is a schematic illustration of a second embodiment of the apparatus of the invention.

FIG. 2 illustrates another embodiment of the invention, in which vehicles transiting on a stretch of road having three lanes on each side, are checked without being obliged to form a single line. The six lanes, on the two sides of the road, are indicated by 21, 22 and 23 on one side and 24, 25 and 26 on the other side. Vehicles 29 are traveling, at the moment in question, on the left side of the road in the direction of the arrow. Transmitting beacons 31, 32 and 33 are placed underground on the left side of lanes 21, 22 and 23 respectively, and RU processors 34, 35 and 36 are placed underground on the right side of lanes 21, 22 and 23 respectively. Left and right are relative to the direction of travel. The operation of each couple of beacon and RU processor is the same as the operation of the beacon and RU processor of FIG. 1.

Figure 3:
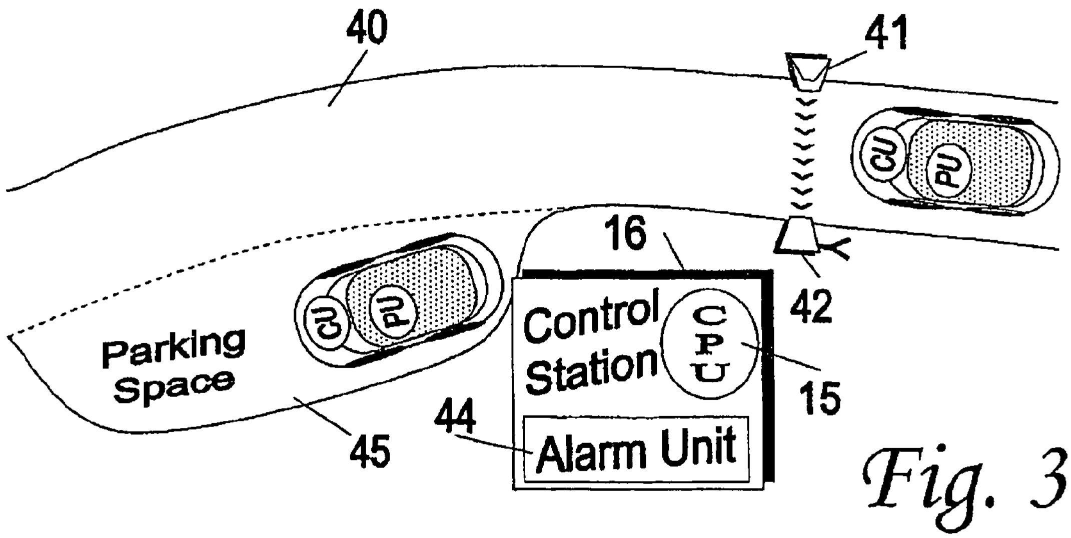
FIG. 3 is a schematic illustration of a third embodiment of the apparatus of the invention.

FIG. 3 is a diagram illustrating the general arrangement of an apparatus according to an embodiment of the invention. For simplicity, a single-lane road 40 is shown in which the vehicles travel in the direction of the arrow. Transmitting beacon 41 and RU processor 42 are placed at the checking station at the two sides of the road. An alarm unit 44 is placed further down at the control station 16. In correspondence with the control station 16, the road is widened to form a parking space 45, to which the suspect vehicles to be controlled are deviated and in which they are parked while being controlled and while the traffic continues.

FIG. 4A is a scheme for a personal unit (PU). In one embodiment, said unit comprises a transmitter 50 and memory 56. The memory 56 is used for storing the driver ID. In one embodiment, the memory 56 is a type of Read Only Memory (ROM). In one embodiment, the transmitter is used for modulating and transmitting the driver ID, and thus is capable of accessing the memory 56 and retrieving the information stored therein.

The PU may include additional means as sown in FIG. 4B. The PU may further comprise a small keypad 55 for entering a code, and a processor 52, that can be used for authenticating the driver attempting to use the PU. The PU may further comprise a receiver 51 and an alarming device 58 (e.g., buzzer, vibrator), that can be used to alert the driver to slow down and to stop the vehicle beside the control station for "the check". In such implementations the control station 16 transmits an alerting signal to be received by the PU of the passing vehicle for producing an alert via the alarming device 58.

FIG. 5 is a scheme of a car unit (CU). As it is seen, it comprises a transmitter 500, a receiver 510, a memory for storing the vehicle ID, and a processor 520, like the PU. It naturally comprises a dry contact 550. The transmission of the CU signal may be performed periodically, continuously, or on demand, whenever the CU receives a demand for a CU signal. This CU implementation may optionally be used to carry out one embodiment of the invention without utilizing a transmitting beacon. For example, the RU may be adapted to periodically transmit such demands to the passing vehicles'CUs. In one embodiment, the transmission of this demand is a short range transmission, and when it is received by the CU of a passing vehicle, said CU will transmit CU signals as required. However, if a transmitting beacon is not used then it may be impossible to single out vehicles not having a CU or having a damaged of malfunctioning CU.

FIG. 6 is a schematic illustration of an embodiment of the process of the invention. PU 60 transmits driver ID to CU 61. Transmitting beacon 62 continuously transmits a signal 17 to RU processor 63. If a car 64 passes between said beacon 62 and said processor 63, its signal is blocked as shown at 64, and the signal 65 originating from the CU 61 and including its vehicle and the driver ID, is sensed by the RU processor 63. The vehicle registration center 66 keeps the RU processor 63 updated with the vehicle and driver database 67. If the RU processor 63 does not find in said database 67 an item corresponding to signal 65, the RU processor 63 transmits an alarm 68 to the control processor 69. As was previously discussed, in order to simplify the RU implementation the examining of the CU signal can be carried out by the processor 69 at the control station 16.

In the aforesaid diagram and in the proceeding figures and examples it has been assumed that the RU processor directly sends the alarm and the corresponding CU signal to the control processor when a suspect car has been found to pass, but it would be possible for the RU processor to transmit the same alarm and signal to an intermediate device located at the checking station, and this latter could transmit it to the control station, or an operator, assigned said intermediate device could send such a signal to the control processor or to an operator located at the control station. All the other elements and details of the embodiments of the invention would remain unchanged. It should be understood that, while an automatism of the process as complete as possible is generally desirable, it may be convenient in some cases to entrust some operational phases or actions or initiatives to operators, belonging, e.g., to the armed forces or to the police.

When the difference between the CU signal and the closest one in the database, viz., the reason why the vehicle is "suspect", is that the same vehicle identity is not associated in the database with the driver ID received by the CU from the PU and communicated by the CU to the checkpoint receiving station, there is nothing objectionable with the vehicle itself. Nevertheless, it must be stopped for control. Now, the vehicle identification comprises the type of the vehicle, its color and its license plate, so that even if there is nothing wrong with the suspect vehicle itself, it is easy for the control personnel to recognize it when it reaches the control station and to carry out the control. If it is found that the driver is not an authorized driver for the vehicle, the consequences of this fact are a matter for the control personnel to decide and are not a part of the invention.

One embodiment of the invention may be also used for determining the speed of moving vehicles by placing one or more additional transmitting beacons and RU processors along the road in predetermined distances. In this case, the control station will receive and log the ID information of each passing vehicle received from each of each RU processor, and compute the vehicles speed according to the time differences between the transmissions. The control center may issue an alarm including vehicle identification details whenever the speed of a vehicle is above the allowed speed. Alternatively, the logged identifications of the vehicle and/or driver may be used to send traffic tickets later, by mail for instance.

According to another embodiment of the invention the signal transmitted by the CU is received by the RU processor without utilizing a beacon for signaling the passing of the vehicles. In such cases the RU processors is capable of identifying the CU signals and process them selectively. For example, the RU processor may be capable of determining the power of the CU signal and thereby to determine the passing of a vehicle when it is recognized that the power of the CU signal starts to decrease.

The RU processor may be placed above the vehicles in control, for example, on top of road signs, on a bridge passing over a road, and the like. In such implementations it may be efficiently used for billing vehicles transiting a toll-road. In one embodiment, the RU processor may be also mounted on a vehicle and be used for controlling moving and/or parking vehicles. Such implementations are particularly useful for charging the parking of cars and/or for issuing (traffic) tickets for the unauthorized parking of vehicles. However, in one embodiment, in order to control parking cars the CU should be adapted to transmit vehicle identification when the vehicles' engine is stopped. These transmissions may be periodically carried out for short instances of time in order to minimize the consumed power.

The CU may be linked to vehicle security system capable of preventing vehicle ignition (antitheft system) such as immobilizer. By linking the CU to such antitheft systems one embodiment of the invention may be used to prevent vehicle theft, by adapting the CU to enable ignition and/or proper operation of the engine via the antitheft system only when the PU signal of authorized drivers is received. This embodiment may be further used by the control station 16 (or the RU) for issuing a signal to be received by the CU for indicating that the vehicle should be stopped. In such case the CU may be adapted to stop the vehicle engine, or disable proper engine operation in a way which will force the driver to slow down or even stop the vehicle.

Identifying CUs may be installed in the vehicles fleets such as car-fleets. The CU signal may be then used to identify vehicles belonging to the fleet and allow or deny their access to certain locations or facilities, such as parking spaces.

One embodiment of the invention may be also used for charging vehicles transiting a toll-road. Of course in such applications there is no need for control station and personnel. In one embodiment, the RU unit may be located on road lanes as illustrated in FIG. 2, and the CU signals received by each RU is transmitted (e.g., via communication wires, or radio transmission) to a control center for logging and billing the owner of the vehicle.

The RU may be linked to photographic means for acquiring pictures of suspicious vehicles, or alternatively of each passing vehicle. The use of photographic means in such applications may be used to carry out one embodiment of the invention without requiring control stations and personnel. The RU in such case can acquire pictures of the transiting vehicles and transmit them together with the CU signal to a control center for further processing. The control center may then instruct security forces for instance to track a suspicious vehicle and stop it for a check.

The CU may be installed in other types objects, such as towable things (e.g., caravans, containers, boats, etc.), which may be used to identify their legal owner and prevent theft, for example.

In one embodiment, the PU may be used to identify the person carrying it when said person is outside the vehicle. By utilizing CU like units, located for instance in public places, for receiving the PU signal forwarding the same for further processing. Said CU like units may be linked (via communication wires or wirelessly e.g., radio transmission) to computerized systems for instance for logging, and/or checking authorization of said person to, access facilities. A transmitting beacon may be similarly used for identifying passage of a person, so an alert may be issued whenever passage of personal without a PU is identified.

One embodiment of the invention may be used to alarm the owner of the vehicle whenever the vehicle leaves a certain location with no permission. For example, a RU like unit may be installed at the garage used for parking the vehicle. Said RU like unit receives the CU signals as long as the vehicle is parked in the garage, and will alarm the owner of the vehicle whenever the vehicle leaves the garage without authorization. For example, by checking if the driver possesses a PU, or if said PU was activate by a code. Of course said RU like unit does not need vehicle/driver database, and it should only include means for identifying the vehicle CU signal and produce an alarm in response to its absence.

In a similar fashion, a CU and RU like units may be used for antitheft implementations by installing said CU like unit in items which are in danger of being stolen, and by equipping a guarding item or person with said RU like unit. For example, the CU like unit may be installed in suitcases and the RU like unit may be installed in a laptop, cellular phone, Personal Digital Assistance (PDA) device, or watch, of the guarding person. In one embodiment, said RU like unit transmits requests for CU signals which whenever received by the CU like unit results in transmittal of the CU signal by it. The RU like unit may be adapted to produce an alarm (e.g., acoustic, optic, electromagnetic) whenever the requested CU signals are not received in response to some predetermined number of its requests for CU signals.

This implementation may be used in a similar way to identify items, for example luggage. In such applications a CU like unit is installed in each item. One who whish to locate a certain item can use an RU like unit to scan such items. The RU like device transmits requests for CU signals receives the CU signals received from said CU like units and extracts the identifying details of each CU signal. The RU like unit may be equipped with a display for displaying the identifying details to the user.

One embodiment of the invention may be also used for identifying personnel, for example, a team of soldiers operating secretly in hostile environment. In such implementation, one of the team's personnel, typically the commander, in equipped with a RU unit capable of receiving the CU signals transmitted from the CUs of all other team members. The RU may be adapted to issue an alarm, preferably a silent alarm, whenever a CU signal of one of the team members is absent for a predetermined period of time. The CUs of the team members may be implemented to periodically transmit their CU signal for identifying the personnel carrying them.

Conveniently, the CUs may be implemented to transmit the CU signal on demand. In such case the RU periodically transmits demand signals to be received by the CUs, and in response the CUs will transmit the CU signal upon receipt of a demand signal. Alternatively, the demand signals are transmitted form the RU whenever the team member carrying it activates such a transmission. Namely, the commander, for instance, can choose to activate the system according to one embodiment of the invention only when it is required.

According to another embodiment of the present invention, a camera is installed above the road. The camera is directed to photograph each car that enters a predetermined photography zone, and operating in combination with a controller that issues a command to the camera which frames to forward to the control center. The controller receives data both from the car and from a car sensor, which may be a pressure-sensitive cable (or any other electro-mechanical transducer) that is mounted on top of the road. Whenever the controller receives a signal from the car sensor, indicating that a car entered the photography zone, the controller checks the CU signal that corresponds to that car. In most cases, when the a particular car is identified as a legal combination of car ID and deriver ID, the controller will not issue any command to forward the photograph of that particular car and the photograph will be deleted from the camera's memory. In other cases, when a suspicious vehicle is identified, the controller will issue a command to forward the photograph of that suspicious car to the Control Center for further processing, and only then, the photograph will be deleted from the camera's memory, as well.

In another embodiment, the camera continuously forwards photograph streams to a computer that applies video motion detection (VMD) operations on the received stream, so as to detect entry of transit vehicles into the photography zone (VMD is a very popular technology that is well known for persons skilled in the art of image processing. Therefore, the detection process will not be discussed in this specification, for the sake of brevity). In this case, any type of a car sensor is not required. The decision whether a transit vehicle actually entered the photography zone is made solely by the computer software. In this case, the camera may be fixed and mounted above the road (e.g., on a bridge or on a post), or may be portable and temporarily mounted on a proper tripod that moves along with the RU. In any case, the camera is being in data communication with the RU.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

The invention claimed is:

1. A system for controlling vehicles, for at least one of security purposes, law enforcement and fleet management, comprising:

a car unit (CU) permanently mounted in each of said vehicles, for transmitting a vehicle identifying signal;

a portable personal unit (PU) carried by a driver, comprising a memory device in which is stored driver identifying data (ID), and a transceiver for periodically transmitting said ID to said CU without any driver initiated operations so that said vehicle identifying signal will also include said ID, transmissions of said PU transceiver having a range sufficient for being received by said CU as long as the driver is in the vehicle, but too short to be received by said CU if the driver leaves the vehicle; and a road unit (RU), comprising a transmitting beacon for continually transmitting a beacon signal, a RU processor for receiving said beacon signal, and a vehicle indicator for indicating passage of a vehicle between said beacon and said processor, wherein said RU processor is operable to receive said vehicle identifying signal when said beacon signal is temporarily blocked by a passing vehicle and to process said vehicle identifying signal, whereby to single out suspect vehicles.

2. The system according to claim 1, wherein the PU is operable to receive and store at least one code which is indicative of the driver ID.

3. The system according to claim 1, wherein the CU is mounted in the vehicle in such a way that would irrevocably damaged and non-functional if removed or changed.

4. The apparatus system according to claim 1, wherein the RU processor has a narrow angle antenna to discriminate between signals from different vehicles.

5. The system according to claim 1, wherein vehicles are singled out whenever the CU signal is not received from a passing vehicle.

6. The system according to claim 1, wherein vehicles are singled out whenever a CU signal received by the RU does not include the driver ID.

7. The system according to claim 1, wherein the RU processor has a memory which contains a database received from and continuously updated by a competent vehicle registration authority and containing all lawful combinations of vehicle identifying data and driver ID, and wherein vehicles are singled out whenever driver and/or vehicle database base records indicate that they should be stopped for a check.

8. The system according to claim 1, wherein the RU is located at a checking station, further comprising a control station provided with a control processor adapted to receive messages from the checking station.

9. The system according to claim 8, further comprising means for direct communication between the checking station and the control station and corresponding processors.

10. The system according to claim 1, further comprising means for logging vehicles identifying data and/or driver ID.

11. The system according to claim 1, wherein the vehicles identifying data and/or driver ID is transmitted and stored in a remote location for logging.

12. The system according to claim 5, wherein the RU processor is adapted to generate an alarm signal to indicate that the passing vehicle is under suspicion and needs to be stopped for a check.

13. The system according to claim 1, wherein the RU processor is mounted on a vehicle for controlling moving and/or parking vehicles.

14. The system according to claim 1-2, wherein the CU is operable to periodically transmit the vehicle identifying signal predetermined period of time.

15. The system according to claim 1, wherein the vehicle identifying signals transmitted by the CU are used for the charging of parking vehicles and/or for the ticketing of unlawfully parked vehicles.

16. The system according to claim 8, further comprising one or more additional RUs separated by a predetermined distance transmitting the vehicle identifying signal of each passing vehicle to the control station to computes a vehicular speed in response to a time differences between vehicle identifying signal transmissions.

17. The system according to claim 8, wherein the RU transmits to the control station an indication whenever it identifies a passing vehicle, and wherein said indication includes the CU signals, if received from the passing vehicle.

18. The system according to claim 5, wherein a control station is operable to single out suspicious vehicles.

19. The system according to claim 18, wherein the CU is linked to an antitheft system of the vehicle and is adapted to disable an ignition, disable proper operation of a vehicular engine, or stop operation of the vehicular engine if a driver ID signal is not received.

20. The system according to claim 18, wherein the CU further includes a memory for storing IDs of authorized drivers.

21. The system according to claim 20, wherein the CU prevents vehicular engine ignition whenever the driver ID received from the PU does not match one of the authorized drivers IDs stored in the CU memory.

22. The system according to claim 19, wherein the CU is used for stopping the engine of the vehicle or for disabling its proper operation after receiving an indication from a control center or from the RU that the vehicle should be stopped for a check.

23. The system according to claim 1, wherein the signal transmitted by the beacon is a light signal, wherein a reflecting mirror is situated at one side of a lane and the beacon and RU processor are situated at the other side of said lane, such that the transmitted signals are reflected by said mirror and received by said processor whenever a vehicle is not passing between the beacon and said minor.

24. The system according to claim 1, wherein the vehicle indicator comprises photographic means for acquiring pictures of passing vehicles or pictures of license plates of passing vehicles.

25. The system according to claim 1, further comprising a control center for receiving and processing CU signals and other information from the RU.

26. The system according to claim 1, wherein CUs is installed in a towable thing for identifying its owner.

27. The system according to claim 1, wherein the vehicle indicator comprises means for measuring a magnitude of a received signal and for enabling processing of said received vehicle identifying signal only if it reaches a maximal magnitude.

28. The system according to claim 1, which is also adapted to bill vehicles traveling on a toll-road, further comprising:

a) one or more of said road units (RU), each of which is installed at a selected location associated with said toll-road; and b) a control center for collecting and processing information received by said one or more RUs, wherein the vehicle identifying signal is transmitted to a RU by the CU of a vehicle passing between the beacon and processor of said RU following temporary blockage of the beacon signal transmitted by said RU, said vehicle identifying signal being received by said RU and forwarded to said control center for further processing and for carrying out the billing.

29. The system according to claim 24, further comprising:

an electro-mechanical car sensor for indicating that a transiting vehicle entered a photography zone of the photographic means;

a memory for storing acquired photographs of said transiting vehicle;

data communication means for forwarding the photograph of any suspected transiting vehicle for further processing; and a controller for detecting suspected vehicles and for issuing a command to said photographic means which photographs to forward for further processing.

30. The system according to claim 24, further comprising:

data communication means for forwarding images of any transiting vehicle for further processing; and image processing means for processing acquired images and for indicating that a transiting vehicle entered a photography zone of the photographic means.

31. The system according to claim 30, wherein the image processing means uses video motion detection (VMD) techniques for processing the acquired images and identifying whether a transiting vehicle entered the photography zone of the photographic means.

32. The system according to claim 6, wherein the RU processor is adapted to generate an alarm signal to indicate that the passing vehicle is under suspicion and needs to be stopped for a check.

* * * * *